Patented June 10, 1952

2,600,364

UNITED STATES PATENT OFFICE 2,600,364

CONDENSATION PRODUCTS OF BENZAN-THRONE-Bz₁-CARBOXYLIC ACID CHLORIDE AND FLUORANTHENE

Wilhelm Schmidt-Nickels, Little York, N. J., assignor to General Aniline & Film Corporation, New York, N. Y., a corporation of Delaware No Drawing. Application February 19, 1949, Serial No. 77,438

4 Claims. (Cl. 260—362)

This invention relates to new and valuable vat dyestuffs containing a benzanthrone nucleus and intermediates therefor and particularly to dyestuffs containing a benzanthrone nucleus reacted with a fluoranthene to form a fast chocolate brown dye.

In the prior art dyestuffs have been prepared by reacting benzanthrone-Bz₁-carboxylic acid chloride with other compounds. None of these dyestuffs, however, are known to be similar in structure or properties to that which I have discovered.

The dyestuffs of my invention are obtained by reacting benzanthrone-Bz₁-carboxylic acid chloride with fluoranthene followed by a ring closure. The resulting dyestuffs have the following general formula:

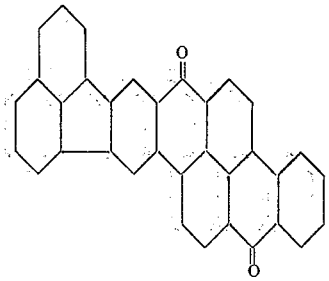

said compound being unsubstituted or containing one or more nuclear substituents of the class consisting of halogen, alkyl, alkoxy, acylamino, nitro and sulfo groups.

The dyestuffs of this invention are prepared by reacting equal molar proportions of fluoranthene and benzanthrone Bz₁-carboxylic acid chloride together with anhydrous aluminum chloride in a solvent such as nitrobenzene. The resultant compound is then ring-closed by alkali fusion as with potassium hydroxide in alcohol. Since some of the product of this latter reaction may be in the leuco form, oxygen is passed through the material to convert all of the product to the dyestuff having the general formula indicated above. The first reaction is carried out at a temperature in the range 60 to 100° C. and preferably in the range 75 to 80° C. The alkali fusion may be accomplished at a temperature of about 200 to 250° C. and preferably about 230° C. The time of the first reaction is several hours while the alkali fusion takes only a few minutes. The dyestuffs obtained dye cotton and other cellulose fibers a chocolate brown in the usual vat dye process to shades having excellent fastness to chlorine bleach.

A preferred method of preparing the dyestuffs of my invention is illustrated by the following example, wherein parts are by weight, but it will be understood that the invention is not limited thereto and that variations and substitutions may be made within the scope of the appended claims.

Example

A charge of 210 parts nitrobenzene, 11.7 parts benzanthrone-Bz₁-carboxylic acid chloride, 48.0 parts anhydrous aluminum chloride, and 8.1 parts fluoranthene is stirred at 75–80° C. for 3 hours. The reaction product is poured into a little water containing 24 parts hydrochloric acid concentrated (35%). The nitrobenzene is then removed by steam distillation. The solid reaction product is filtered and for removal of possibly present benzanthrone-Bz₁-carboxylic acid extracted at 70° C. with a mixture of 108 parts of concentrated ammonia (28%) and 600 parts water. After filtration and washing to neutrality the product weighed 18.1 parts. The cyclization of the thus obtained ketone is carried out as follows:

A charge of 24 parts by weight alcohol and 50 parts potassium hydroxide is heated under agitation to 230° C. while alcohol is allowed to distill off. At 230° C. 5 parts of the ketone is introduced into the melt. After stirring at 230° C. for 5 minutes the mass is poured into 500 parts by weight water. A portion of the formed dyestuff is present in its leuco form which is soluble in the alkaline water giving a violet color. To precipitate all the dyestuff air is blown through the solution for ½ hour. The dyestuff is filtered, washed neutral and dried. A dyestuff paste can be made by the known method of dissolving the dyestuff in concentrated sulfuric acid and pouring the solution in water. The product dyes cotton from a hydrosulfite vat a pleasant chocolate brown shade of excellent chlorine fastness. This reaction may be represented by the following scheme:

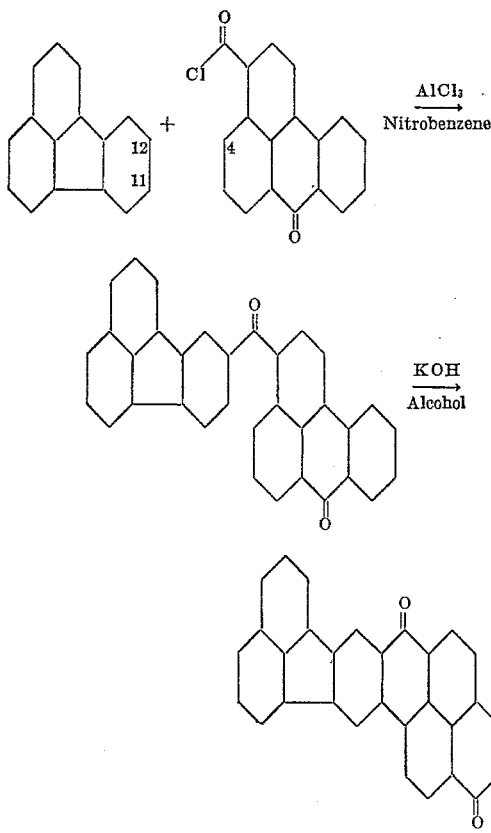

Similar dyestuffs are obtained by employing, instead of fluoranthene and benzanthrone Bz₁-carboxylic acid chloride in the foregoing example, equivalent quantities of nuclear substitution products of either one or both of these intermediates containing one or more alkyl groups apiece. Alternatively, the compound obtained by the example, either unsubstituted or containing alkyl substituents may have other substituents introduced by the known procedures such as halogen, alkoxy, nitro, sulfo and acylamino groups. Substituent alkyl groups in the original intermediates, of course, may not be present in positions to block the reaction and ring closure (4, in the benzanthrone and 11, 12 in the fluoranthene). It will be understood that such groups as halogen groups present in the original intermediates might not withstand the drastic conditions of the reactions and if these substituents are desired, they may be introduced after the dyestuff has been formed by procedures customarily used for introducing such substituents into vat dyestuffs of the benzanthrone series.

If desired, chocolate brown vat dyestuffs of this invention can be converted into the alkali metal salt of the sulphuric acid ester of the corresponding leuco compound by the usual methods, for example, by reduction of the dyestuffs with a hydrogen liberating metal such as iron or zinc, preferably accompanied by a minor amount of copper, in a mixture of chlorsulfonic acid and pyridine followed by drowning of the reaction mixture in an aqeous alkali metal carbonate solution and salting out of the resulting leuco ester salt after removal of the pyridine by distillation. The resulting leuco sulphuric acid ester salts yield shades having color and fastness properties similar to those obtained by vat dyeing processes from the original dyestuffs, upon application by printing or dyeing of the material and development of the color by treatment with an acid oxidizing bath.

I claim:
1. A compound having the following formula:

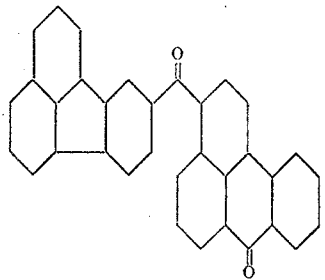

2. A vat dyestuff having the following formula:

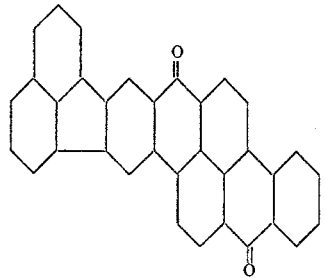

3. An alkali metal salt of the sulphuric acid ester of the leuco compound of the dyestuff defined in claim 2.

4. A process for preparing a chocolate brown vat dyestuff of the benzanthrone series which comprises reacting one mole of benzanthrone-Bz₁-carboxylic acid chloride with one mole of fluoranthene at an elevated temperature and subsequently ring closing the ketone thus formed.

WILHELM SCHMIDT-NICKELS.

REFERENCES CITED

The following references are of record in the file of this patent:

FOREIGN PATENTS

| Number | Country | Date |
|---|---|---|
| 123,267 | Switzerland | May 4, 1926 |